May 15, 1956 C. M. GARNER 2,745,630
CONTROL MEANS FOR SOLENOID ACTUATING DEVICE
Original Filed June 19, 1946 2 Sheets-Sheet 2
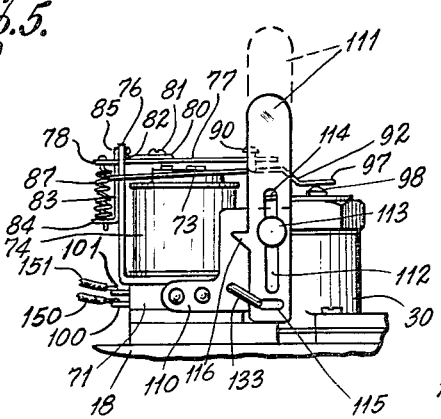
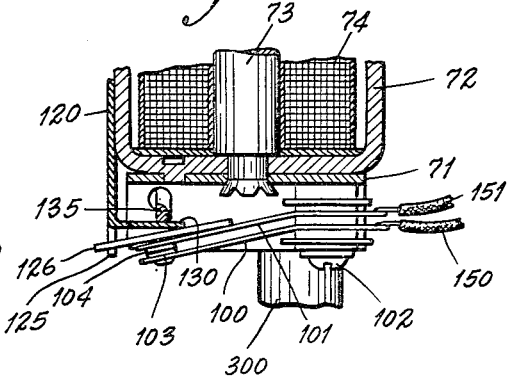
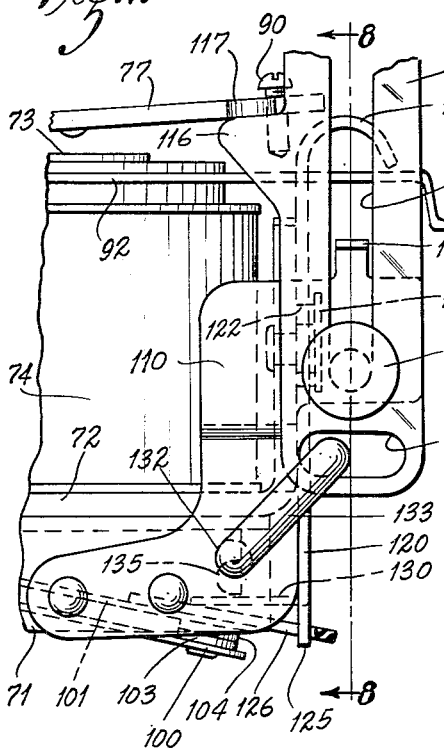
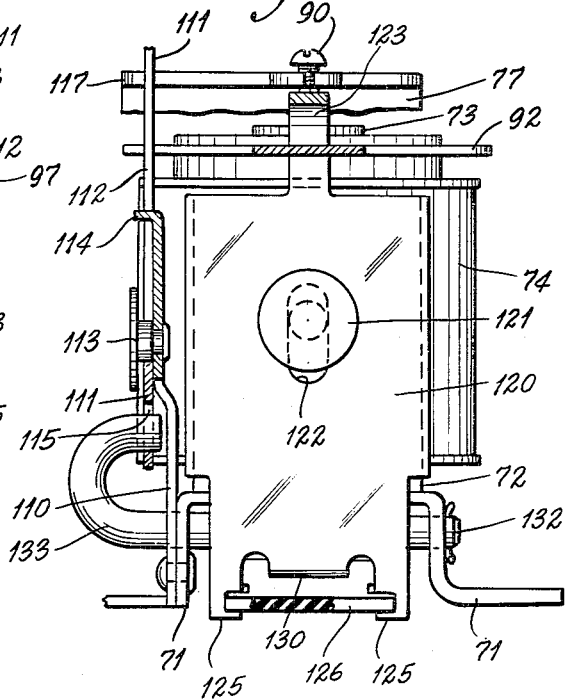
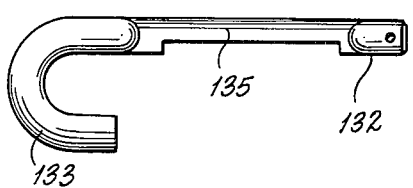
INVENTOR:
CLAUDE M. GARNER
BY Kingsland, Rogers & Ezell
ATTORNEYS United States Patent Office 2,745,630
Patented May 15, 1956

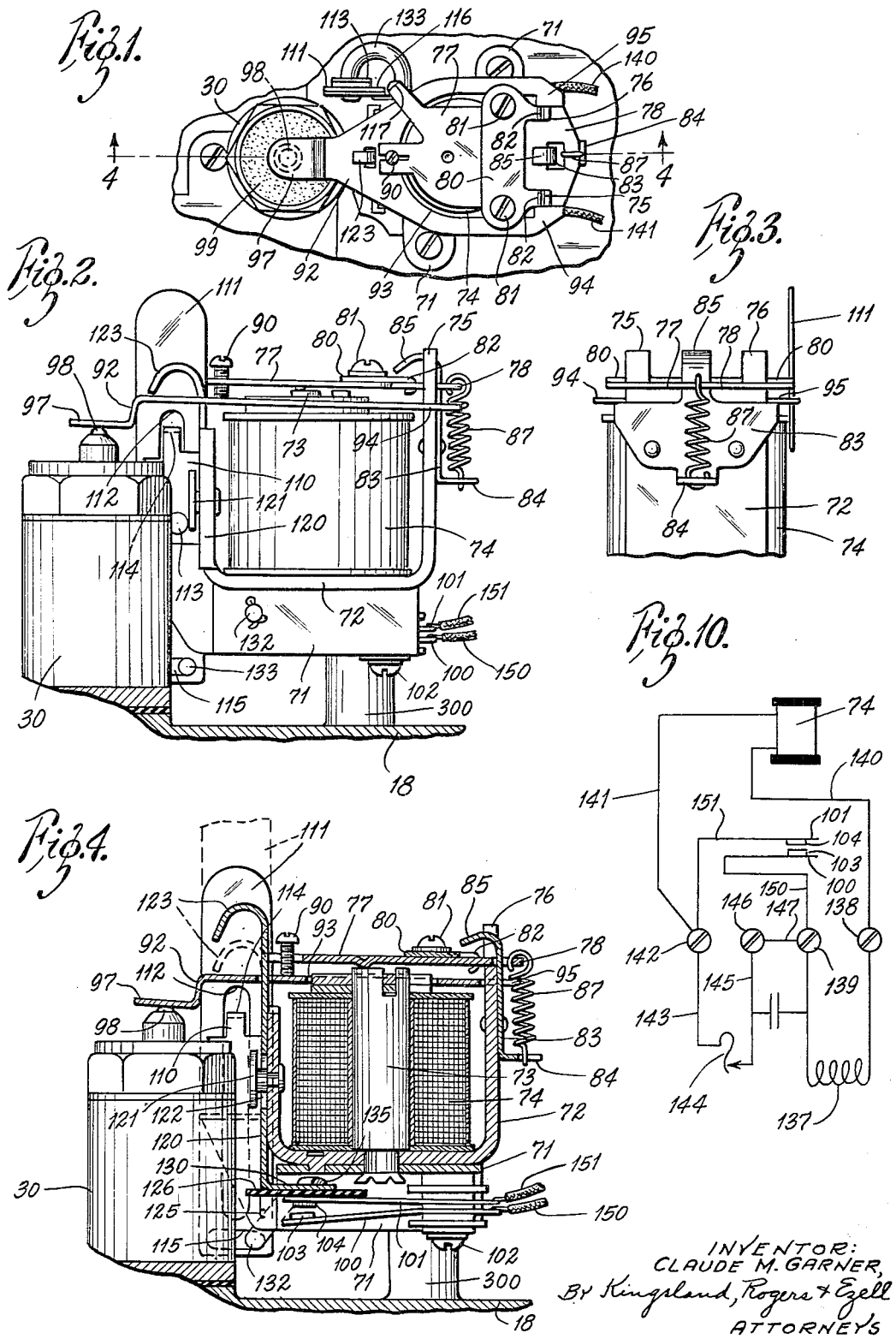

2,745,630

CONTROL MEANS FOR SOLENOID ACTUATING DEVICE

Claude M. Garner, Clayton, Mo., assignor to Missouri Automatic Control Corporation, St. Louis, Mo., a corporation of Missouri Original application June 19, 1946, Serial No. 677,830. Divided and this application March 15, 1952, Serial No. 276,782

8 Claims. (Cl. 251—130)

The present invention relates to a solenoid actuating device. More particularly, it relates to such a device used to actuate a moving member such as a valve to control gas flow and the like in response to control device such as a thermostat and means for operating the moving member independently of the solenoid actuating device in the event of a power failure.

Broadly, it is an object of this invention to provide means for actuating a member, such as a valve, by a thermostatically operated solenoid whereby a manual control can be used in the event of power failure.

It is a further object of this invention to provide automatic means in such a manually operated control device for rendering it inoperative when power is reestablished to the thermostatically operated solenoid member.

Other objects will appear in the description to follow.

This application is a division of application Serial No. 677,830, filed June 19, 1946, issued June 3, 1952 as United States Patent No. 2,598,902.

In the drawings:

Fig. 1 is a plan view of the actuating device;

Fig. 2 is a side elevation of the device of Fig. 1;

Fig. 3 is a fragmentary end elevation taken from the right end of Fig. 1;

Fig. 4 is a longitudinal vertical section taken on the line 4—4 of Fig. 1;

Fig. 5 is a side elevation of the device shown in Fig. 1 taken from the side opposite that of Fig. 2;

Fig. 6 is a view of the thermostat switch in closed position, this switch being shown in open position in Fig. 4;

Fig. 7 is an enlarged view of the manual control mechanism shown in Fig. 5;

Fig. 8 is an end elevation of this part of Fig. 5 taken approximately on the line 8—8 in Fig. 7;

Fig. 9 is a view of the manual control crank in this mechanism;

Fig. 10 is a wiring diagram of the mechanism.

Referring now to the drawings, in Fig. 2 the solenoid actuating device and the master control is shown as being mounted adjacent to a valve 30 on a base 18 of the valve (which is shown only in fragmentary form) so as to operate a moving valve member 98 in the valve 30. It is to be understood that this invention is shown in connection with a valve only for purposes of illustration and that it can be used in connection with other operating members as will appear hereinafter.

The valve is operated by a magnetic coil that is adapted to be connected for energization when a room thermostat or the like closes. This part of the mechanism includes a supporting bracket or base 71 which is in the general shape of an inverted U, with horizontally projecting ears that are screwed to upstanding bosses 300 on the member 18.

The bracket 71 receives on its upper surface a U-shaped coil support 72. A center post 73 is permanently fixed to the support 72, and about this post, there is provided a magnetic coil 74.

The inner vertical arm of the bracket 72 has two upstanding ears 75 and 76 between which is fitted a rocking armature 77 having a tongue portion 78 that projects outwardly through the two upstanding ears. This tongue extends laterally, as shown in Fig. 1, to the back sides of the two prongs 75 and 76. Thus, the armature is restricted against movement to the leftward in Figs. 1 and 4. It is restricted against movement to the right by presence of a plate 80 that is held by screws 81 to its top. This plate is provided with two downturned hooks 82 that are located adjacent the lefthand faces of the two prongs 75 and 76. They, therefore, prevent the armature plate 77 from slipping to the right in Figs. 1 and 4.

The same inner upstanding arm of the bracket 72 receives a fitting 83 that has an outstanding end 84 at its lower part and an overhanging hook-like portion 85 at its top. This hook-like portion passes through an opening in the armature 77, and by overlying the armature, limits the upward displacement of the right end thereof, as shown in Fig. 4.

A coil spring 87 is stretched between the projecting end 78 of the armature member and the lower projection 84 on the fitting 83. It, therefore, urges the armature member 77 to pivot in a clockwise direction, as appears in Fig. 4, the rocking taking place about the edge of the upstanding arm of the bracket 72 between the two prongs 75 and 76.

When the coil 74 is energized, it is adapted to attract the armature 77 and rock its outer end downwardly, stretching the spring 87. The outer or forward end of the armature carries an adjustable abutment screw 90, for a purpose to appear.

An actuating blade 92 is disposed below the armature 77. It is preferably of spring-like material formed from a plate with a large opening 93 therein. This plate has backwardly projecting ears 94 and 95 that are set back to rest on the projecting portions of the plate 83 that extend, as shown in Fig. 3, laterally beyond the limits of the upstanding arm of the bracket 72.

The arm 92 has a forward extension 97 thereon that is preferably offset downwardly, as shown. This arm engages a push rod 98 that extends down through the valve 30 so as to actuate reciprocally a valve member (not shown). A suitable, flexible diaphragm 99 is provided to seal off the top of the cylindrical valve member 30, and yet to permit reciprocal operation of the push rod 98.

Below the bracket 71, a switch mechanism is fastened. This switch consists of two spring blades 100 and 101 that are secured to the bottom of the supporting bracket 71 by suitable screws 102, with the interposition of the necessary insulation. As shown in full lines in Fig. 4, the two switch blades 100 and 101 normally rest with their contacts 103 and 104, respectively, disengaged.

This switch is part of a manual operating mechanism which is designed to actuate the valve operating push member 98 and to close the switch contacts at the same time. This manual mechanism includes an upstanding support standard 110 that is riveted to the outer vertical side of the inverted U-shaped support 71. The standard 110 slidably supports a manual operating strip 111, which strip has a vertical slot 112 therein that receives a headed rivet 113, which rivet is fixed into the standard 110. The standard likewise has a projecting nib 114 that fits within the slot so as to prevent rotation of the manual strip 111 and to confine it to vertical movements.

In addition to the slot 112, the strip 111 has a slot 115 at its bottom that extends transversely thereof. On its side edge, the strip 111 has a projecting shoulder 116 that is disposed so as to come under an arm 117 that projects at an angle from the rocking armature 77.

On the outer leg of the coil supporting bracket 72, there is a flanged plate 120. The flanges confine this plate to vertical movement, and it is further confined by a headed rivet 121 secured to the coil support 72 and operating in a vertical slot 122 in the flanged plate 120.

This plate, at its upper end, has a curved neck portion 123 that passes upwardly through an opening in the actuating blade 92 and is hooked over the top thereof.

The lower end of the plate 120 has two depending prongs 125. These prongs receive a notched piece of insulation 126 that overlies the upper switch blade 101. The notches and their engagement with the prongs 125 prevent this strip of insulating material from slipping out of position. It is further confined by an inwardly turned prong 130 that overlies it. This prong 130 extends above the switch blades and between the vertical sides of the bracket 71. It also underlies a semi-circular crank 132. This crank is supported in the side walls of the supporting bracket 71 and passes through one of the side walls, to provide a curved crank arm 133. Between the two side walls of the bracket 71, the crank 132 has an offset semi-circular portion 135. When the crank is turned, this offset portion may move from its position in Fig. 4 to its position in Fig. 6. In Fig. 4, it will be seen that it presents its flat part to the inwardly turned tongue 130, but, when it is turned to slightly beyond 90°, it depresses the prong 130 and closes the two switch contacts.

This crank is actuated by the engagement of its semi-circular arm 133 in the slot 115 of the manual operating strip 111.

It will be seen that, when the manual operating strip is pulled upwardly, it turns the crank arm slightly over 90°. In so doing, it closes the switch contacts and also causes the tongue 130 of the plate 120 to move downwardly. This latter movement causes the hooked upper part 123 on the plate 120 to engage the operating plate 92 and bring the same downwardly to operate the valve actuating push rod 98.

Fig. 10 shows the manner of electrically connecting this part of the mechanism. A source of power is shown in the form of a secondary winding 137, connected to two terminals 138 and 139. A wire 140 connects the terminal 138 with the coil 74. A wire 141 connects the other end of the coil 74 with a terminal 142. This terminal is connected by a wire 143 to the room thermostat, generally indicated at 144. The other side of the room thermostat is connected by a line 145 with a terminal 146, that is connected by a line 147 with the terminal 139.

The switch contacts 103 and 104 are connected across the terminals 139 and 142. The switch contact 103 is connected by a line 150 with the terminal 139, and the switch contact 103 is connected by a line 151 with the terminal 142.

Operation

When the thermostat 144 closes, it brings power to the coil 74, as is evident in Fig. 10, the circuit being completed from the coil 137 through the terminal 138, the line 140, the coil 74, the line 141, the terminal 142, the line 143, the thermostat 144, the line 145, the terminal 146, the line 147, and the terminal 139 back to the secondary coil 137. When the coil 74 is thus energized, it draws down the rocking armature 77 until the same engages the top of the post 73. This downward movement of the armature 77 causes the screw 90 to engage the spring actuating blade 92, forcing the same down. It rocks by the engagement of its inner end in the notches on the sides of the upstanding end of the bracket 72, so that its outer end 97 depresses the valve operating end 98.

This action may normally be opposed by a conventional biasing spring operating against valve operating pin 98. Also, the rocking of the armature 77 downwardly causes extension of the coil spring 87, which tends to return the armature when the magnetic force is relieved.

The present mechanism provides means to open the valve manually in case of power failure, coupled with mechanism to return the valve automatically to control by power upon restoration thereof. Such operation is here attained by the manual blade 111, which may be lifted.

Lifting of the blade 111 rocks the curved end 133 of the crank 132, and the semi-cylindrical portion 135, and thereby depresses the tongue 130 of the end plate 120. The contact of the tongue 130 with the insulating sheet 126 and the contact of the latter with the switch blade 101 causes the upper switch blade to move downwardly to bring the contact 103 against the contact 104, as shown in Fig. 6, thus closing the switch. Likewise, the downward movement of the end plate 120 causes its upper hook 123 to engage the operating member 92 and to depress the same, drawing it away from the rocking armature 77, and causing the end 97 of the member 92 to depress the pin 98 to operate the valve. When this movement of the blade 111 is completed, the crank arm 135 will have moved slightly beyond 90°, so that the upward force of the spring-like switch blades will merely tend to drive the crank arm further, rather than to reverse it. Such further movement is prohibited by the engagement of the crank parts. Hence, the parts will stay in the positions aforesaid, by this over-center lock arrangement.

As the blade 111 is moved to its upper position, its shoulder 116 rests immediately under the projection 117 on the armature 77 when the latter is in its upper released position to which it is drawn by the spring 87.

Under the foregoing conditions, the valve will be in the same position it will occupy if power were on and the room thermostat were closed. The moment that power is restored, the coil 74 will be energized through the contacts 103 and 102, which shunt the room thermostat. The energization of the coil 74 will pull the armature 77 down, which will, by action against the shoulder 116 of the blade 111, depress the blade and cause it to return the crank arm over center, until the spring action of the blade cooperates with gravity and the downward pull of the armature 77 to complete the release of the manual means and the opening of the switch. Thereupon the further operation will return to control the room thermostat.

Although the solenoid actuating device has been described in connection with a valve, it is to be understood that this is for purposes of illustration only and in actual practice the device can be used to operate any type of reciprocable member as will be apparent to those skilled in the art.

What is claimed is:

1. A valve operating means including a coil, an armature wholly situated exteriorly of the coil and movable upon energization of the coil, an operating member adapted to be removed by the armature, manual means to operate said operating member including a first member movable from a released position into position to be engaged by the armature and returned to released position upon energization of the coil, a second member engageable with the operating member to move the same, means connecting the two members so that when the first member is moved to its position to be engaged by the armature the second member will be moved to actuate the operating member, and means releasably holding the manual means in said position, the coil upon energization being adapted to actuate the armature to engage the first member, return the same to its released position, and to release the second member.

2. A valve operating means including a coil, an armature wholly situated exteriorly of the coil and movable upon energization of the coil, an operating member adapted to be moved by the armature, manual means to operate the operating member including a first member movable from a released position into position to be engaged by the armature and returned to released position upon energization thereof, a second member engageable with the operating member to move the same, means connecting the two members so that when the first member is moved to its position to be engaged by the armature the second member will be moved to actuate the operating member, including a rockable member connected to the first and second members and pivoted between them, so that when the first member moves in one direction the second member will be moved in the other, means releasably to hold the manual means in said position, the coil upon energization being adapted to actuate the armature to engage the first member, return the same to its released position, and to release the second member.

3. A valve operating means including a coil, an armature wholly situated exteriorly of the coil and movable upon energization of the coil, an operating member adapted to be moved by the armature, manual means to operate the operating member including a first member movable from a released position into position to be engaged by the armature and returned to released position upon energization thereof, a second member engageable with the operating member to move the same and operate the valve, means connecting the two members so that when the first member is moved to its position to be engaged by the armature the second member will be moved to actuate the operating member, including a crank member having a crank arm pivotally connected with the first member, and a crank portion engageable with the second member, so that movement of the first member rocks the crank and causes it to move the second member, means releasably to hold the manual means in said position, the coil upon energization being adapted to actuate the armature to engage the first member, return the same to its released position, and to release the second member.

4. A valve operating means including a support, a coil thereon, an armature therefor wholly situated exteriorly of the coil and rockable on the support, operating means including a member displaceable by the armature upon energization of the coil, manual means for actuating the operating means to the same extent as said armature, including a handle member movable on the support from a released position to a position engageable by the armature when the same is moved by the coil, said handle members being adapted to be returned to released position by the energization of said coil, a second member movably mounted on the support and having a portion engageable with the operating member to displace the same, a crank pivotally mounted on the support, the crank having an arm engageable with the handle member, to cause rocking of the crank when the handle member is moved manually from released position, the crank having a crank portion engageable with the second member to displace it and move the operating member as the handle member is moved, and means releasably to hold the manual means in the position to which it is manually moved.

5. A valve operating means including a support, a coil thereon, an armature therefor wholly situated exteriorly of the coil and rockable on the support, operating means including a member displaceable by the armature upon energization of the coil, manual means for actuating the operating means to the same extent as said armature, including a handle member movable on the support from a released position to a position engageable by the armature when the same is moved by the coil, said handle member being adapted to be returned to released position by the energization of said coil, a second member movably mounted on the support and having a portion engageable with the operating member to displace the same, a crank pivotally mounted on the support, the crank having an arm engageable with the handle member, to cause rocking of the crank from an initial position when the handle member is moved manually from released position, the crank having a crank portion engageable with the second member to displace it and move the operating member as the handle member is moved, and means releasably to hold the manual means in the position to which it is manually moved, said last-named means including a resilient means acting against the crank to urge it toward initial position, the crank being movable slightly over center with respect to the force of said resilient means.

6. A valve operating means including a support, a coil thereon, an armature therefor wholly situated exteriorly of the coil and rockable on the support, operating means including a member displaceable by the armature upon energization of the coil, manual means for actuating the operating means to the same extent as said armature, including a handle member movable on the support from a released position to a position engageable by the armature when the same is moved by the coil, said handle member being adapted to be returned to released position by the energization of said coil, a second member movably mounted on the support and having a portion engageable with the operating member to displace the same, a crank pivotally mounted on the support, the crank having an arm engageable with the handle member, to cause rocking of the crank from an initial position when the handle member is moved manually from released position, the crank having a crank portion engageable with the second member to displace it and move the operating member as the handle member is moved, and means releasably to hold the manual means in the position to which it is manually moved, said last-named means including a switch adapted to be closed by the manual means, the switch having a resilient means acting against the crank to urge it toward initial position, the crank being movable slightly over center with respect to the force of the resilient means, the switch being in a parallel circuit with the coil to connect the same with a source of power.

7. A device of the character described for operating a reciprocable member comprising a coil, a movable armature wholly situated exteriorly of the coil, an operating member adapted to be moved by the movement of the armature to operate the reciprocable member, manual means to operate the reciprocable member to the same extent as said armature when the coil is inoperative including a first member movable from a released position adjacent the armature, a second member adapted to move the operating member and the reciprocable member independently of the armature, means connecting the first and second members so that when the first member is moved to its operating position the second member will be moved to operate the reciprocable member, and means releasably holding the manual means in operated position, said last named means being adapted to be overridden by the armature when the coil is energized and the first member is then adapted to be returned to its released position and the second member is released.

8. A device of the character described for operating a reciprocable member comprising a coil, a movable armature wholly situated exteriorly of the coil, an operating member adapted to be moved by the movement of the armature to operate the reciprocable member, manual means to operate the reciprocable member to the same extent as said armature, when the coil is inoperative including a first member movable from a released position adjacent the armature, a second member engageable with the operating member to move the same and operate the reciprocable member, means connecting the first and second members so that when the first member is moved to its operating position the second member will be moved to operate the reciprocable member, and means releasably holding the manual means in operated position, said last named means being adapted to be overridden by the armature when the coil is energized and the first member is then adapted to be returned to its released position and the second member is released, said last-mentioned means including a shunt connection to said coil for energizing it independently of said manual means and means for automatically restoring the manual control when said coil is energized.

References Cited in the file of this patent

UNITED STATES PATENTS

| | | |
|---|---|---|
| 2,038,748 | Mantz | Apr. 28, 1936 |
| 2,155,358 | Cyr | Apr. 18, 1939 |
| 2,358,999 | Ray | Sept. 26, 1944 |
| 2,622,622 | Ray | Dec. 23, 1952 |
| 2,635,635 | Eimermann | Apr. 21, 1953 |